United States Patent
Sawaguchi et al.

[11] Patent Number: 6,114,026
[45] Date of Patent: Sep. 5, 2000

[54] COATING TYPE MAGNETIC RECORDING MEDIUM

[75] Inventors: Masahiro Sawaguchi; Kazuhiko Suzuki; Yuko Abe, all of Miyagi, Japan

[73] Assignee: Sony Corporation, Tokyo, Japan

[21] Appl. No.: 09/057,609

[22] Filed: Apr. 9, 1998

[30] Foreign Application Priority Data

Apr. 11, 1997 [JP] Japan ................... 9-094082
Jun. 27, 1997 [JP] Japan ................... 9-172553

[51] Int. Cl.$^7$ .................................................. G11B 5/702
[52] U.S. Cl. .................. 428/323; 428/694 BP; 428/694 BU; 428/900
[58] Field of Search .............. 428/323, 694 BP, 428/694 BU, 900

[56] References Cited

U.S. PATENT DOCUMENTS

| | | |
|---|---|---|
| 4,391,864 | 7/1983 | Hosaka et al. .................. 428/64 |
| 4,554,220 | 11/1985 | Yamamoto et al. ............. 428/694 |
| 4,696,869 | 9/1987 | Funanashi et al. ............. 428/695 |
| 5,270,109 | 12/1993 | Nishikawa et al. ............ 428/336 |

*Primary Examiner*—Stevan A. Resan
*Attorney, Agent, or Firm*—Hill & Simpson

[57] ABSTRACT

An object of the present invention is to impart good running stability and durability to a magnetic recording medium comprising a combination of a polyester polyurethane resin and a phenox resin as a binder for a magnetic layer of a coating type magnetic recording medium while ensuring excellent static magnetic properties.

In order to achieve the object, the present invention provides a coating type magnetic recording medium having a magnetic layer formed on a nonmagnetic support and containing a magnetic powder, a binder and a lubricant, wherein a combination of a polyester polyurethane resin and a phenox resin is use as the binder, a combination of a polyhydric alcohol ester and silicone oil is used as the lubricant, and the surface extraction of the lubricant from the coating type magnetic recording medium is $3.0 \times 10^{-3}$ to $3.0 \times 10^{-2}$ g/m$^2$.

4 Claims, No Drawings

COATING TYPE MAGNETIC RECORDING MEDIUM

BACKGROUND OF THE INVENTION

1. Field of the Invention

The present invention relates to a coating type magnetic recording medium in which a magnetic layer is formed on a nonmagnetic support.

2. Description of the Related Art

A magnetic layer of a coating type magnetic recording medium such as a magnetic tape or the like generally contains a magnetic powder, a binder and a lubricant. As such a binder, a vinyl polymer (vinyl chloride, vinyl acetate, and the like) or vinyl copolymer, a cellulose derivative, a polyurethane resin, and the like are used in an appropriate combination according to the purpose of use.

However, a vinyl chloride-vinyl acetate copolymer, which is a typical vinyl copolymer, has high elasticity and good crosslinking properties, and can thus contribute to improvement in durability and running performance of a magnetic recording medium, but it has the fault that dispersibility of the magnetic powder is insufficient.

For nitrocellulose which is a typical cellulose derivative, from the viewpoint of its molecular structure, it is impossible to adsorb (knead) nitrocellulose in a state where a high concentration of magnetic powder required for high dispersion is contained. Therefore, nitrocellulose has good durability, but has the problem of limiting conditions of use. For acetyl cellulose, the use thereof is limited from the viewpoints of dispersibility of the magnetic powder and compatibility with other resins.

Although a polyurethane resin is excellent in dispersibility of the magnetic powder and adhesion to the nonmagnetic support, the production conditions are limited due to an increase in viscosity during preparation of a magnetic coating, thereby causing problems with running performance and durability of a magnetic recording medium.

For the magnetic recording medium, the magnetic powder is generally improved (fine powder and high anti-magnetic properties) for achieving high density and high performance, with corresponding demand for a binder exhibiting high dispersibility, high durability and high running performance.

Therefore, an attempt is made to use a combination of a polyester polyurethane resin and a vinyl chloride-vinyl acetate copolymer as the binder. In this case, the advantages of the respective resins are effectively used for improving adhesion between the nonmagnetic support and the magnetic layer, the dispersibility of the magnetic powder, the durability and running performance of the magnetic medium, etc. to some extent. However, there are problems in that the improvements cannot be said to be sufficient, and thermal disposal is difficult because the binder contains chlorine.

In order to solve this problem, an attempt has recently been made to use a combination of a polyester polyurethane resin and a phenoxy resin as the binder.

On the other hand, as the lubricant added to the magnetic layer of the coating type magnetic recording medium, conventionally, a liquid lubricant such as a fatty acid lubricant, a higher alcohol lubricant, an amide lubricant, a fatty acid ester (salt) lubricant, a silicone oil lubricant, a fluorine lubricant, or the like; a solid lubricant such as carbon black or the like can be used. Any one of these lubricants can be appropriately selected according to the purpose of use of the magnetic recording medium.

However, when a combination of a polyester polyurethane resin and a phenoxy resin is used as the binder, although the problems with a combination of a polyester polyurethane resin and a vinyl chloride-vinyl acetate copolymer can be solved to some extent, there is demand for further improving the dispersion stability of a magnetic coating and the running reliability and durability of a magnetic recording medium using the binder.

In regard to the lubricant, a fatty acid lubricant has the large effect of decreasing friction due to the addition thereof, but it has problems of high interaction with the magnetic powder and other raw materials due to the degree of polarity of the functional groups, and the difficult addition method. Also, in a frictional state, the lubricant is easily exhausted due to contact (solid) friction, thereby causing the problem of decreasing the amount of the lubricant present on the surface at high temperature and high humidity. Therefore, the lubricant itself has insufficient stability.

A fatty acid lubricant exhibits low interaction with the magnetic powder and good stability, but has the problem of the low effect of decreasing friction for the adding amount. There is also a problem in that the friction coefficient at high temperature is easily increased. Although this problem can be solved to some extent by increasing the molecular weight of a fatty acid ester or changing the stereostruction thereof, the new problem of deteriorating compatibility with the magnetic coating occurs.

For a higher alcohol lubricant, the friction decreasing effect deteriorates at low temperature. For a fatty acid salt lubricant, the possibility of reaction with other components in the magnetic coating with the passage of time cannot be denied. For a fluorine lubricant, it is difficult to stabilize dispersion in the magnetic coating, thereby causing the problem of complicating the production process.

Therefore, in the present state, an attempt is made to use a combination of a plurality of different lubricants at various mixing ratios in consideration of the interaction with the binder and the magnetic powder. However, the correlations between factors such as selection of the lubricant, determination of the mixing ratio, the method of adding the lubricant, etc. and the amount of the lubricant present on the surface of the magnetic layer are not sufficiently studied.

SUMMARY OF THE INVENTION

The present invention has been achieved for solving the above problems of conventional techniques, and an object of the invention is to significantly improve running performance and durability of a magnetic recording medium by using an optimum lubricant system when a polyester polyurethane resin and a phenoxy resin are used as binder resins for a magnetic layer.

The inventors found that when a polyester polyurethane resin and a phenoxy resin are combined, the above object can be achieved by using a specified lubricant system showing a specified amount of surface extraction, resulting in the achievement of the present invention.

Namely, the present invention provides a coating type magnetic recording medium comprising a magnetic layer formed on a nonmagnetic support and containing a magnetic powder, a binder and a lubricant, wherein the binder contains a polyester urethane resin and a phenoxy resin, the lubricant contains a polyhydric alcohol ester and silicone oil, and the amount of surface extraction of the lubricant from the coating type magnetic recording medium is $3.0 \times 10^{-3}$ to $3.0 \times 10^{-2}$ g/m$^2$.

DESCRIPTION OF THE PREFERRED EMBODIMENTS

A coating type magnetic recording medium of the present invention will be described in detail below.

An example of the coating type magnetic recording medium in accordance with a basic embodiment of the present invention comprises a magnetic layer formed on a nonmagnetic layer and containing a magnetic powder, a binder and a lubricant, as described above.

In the present invention, a combination of a polyester polyurethane resin and a phenoxy resin is used as the binder. This permits efficient dispersion of the magnetic powder and can impart stable running performance and durability to the magnetic recording medium.

The ratio by weight of polyester polyurethane resin to phenoxy resin is preferably 9:1 to 7:3.

In regard to the glass transition temperature of the binder containing the polyester polyurethane resin and the phenoxy resin, a glass transition temperature excessively lower than the temperature estimated during use causes excessive increase in friction coefficient during use, and thus deteriorates sliding properties, and an excessively high glass transition temperature deteriorates running performance and durability. Therefore, the glass transition temperature is preferably 30 to 70° C.

Also at least one of the polyester polyurethane resin and the phenoxy resin preferably has functional groups for improving the dispersibility of the magnetic powder. Examples of such functional groups include $-SO_4M$, $-SO_3M$, $-SO_2M$, $-COOM$, $-NH_2$, $-NR_2$, $-NR_3$, $-OH$, $-OPO_3M_2$, $-OPO_3R_2$ (M is a hydrogen atom or an alkali metal, and R is alkyl, alkenyl, alkoxy, or the like), and the like.

The content of the functional groups in the polyester polyurethane resin or the phenoxy resin is preferably $1.0 \times 10^{-6}$ to $1.0 \times 10^{-2}$ mol/g.

The content of the binder containing the polyester polyurethane resin and the phenoxy resin in the magnetic layer is preferably 15 to 40 parts by weight relative to 100 parts by weight of magnetic powder.

In the present invention, in addition to a combination of the polyester polyurethane resin and the phenoxy resin, a polyhydric alcohol ester and silicone oil are used for the lubricant, as described above. Further, the surface extraction of the lubricant from the coating type magnetic recording medium is set to $3.0 \times 10^{-3}$ to $3.0 \times 10^{-2}$ g/m². The value of the surface extraction is defined as follows.

A magnetic recording medium having a surface area of 1.0 m² is extracted with a sufficient amount (for example, 200 g) of hexane for a predetermined time (for example, 10 minutes) at room temperature, and then hexane and other volatile components are removed from the resultant extract solution by vaporization. The residue is weighed, and the weight thereof is defined as the surface extraction.

By using as the lubricant a combination of two specified compounds, and setting the surface extraction in the predetermined range, the running stability and durability of the coating type magnetic recording medium can be more improved than the mere use of a combination of the polyester polyurethane resin and the phenoxy resin as the binder.

In the present invention, as the polyhydric alcohol ester, known polyhydric alcohol esters can be used. Particularly, an ester obtained by using glycerin as a polyhydric alcohol can preferably be used. Preferably, an ester of a fatty acid having a carbon number of 3 to 20 and glycerin can be used.

As the silicone oil, known silicone oil can be used.

In regard to the ratio by weight of polyhydric alcohol ester to silicone oil, with an amount of polyhydric alcohol excessively smaller than the silicone oil, the durability deteriorates, and with an amount of polyhydric alcohol excessively larger than the silicone oil, the friction coefficient is increased. Therefore, the ratio is preferably 1:1 to 5:1.

In the present invention, in order to further improve the durability of the magnetic recording medium, a hardener is preferably contained in the magnetic layer so that the magnetic layer has a three-dimensional crosslinked structure. Examples of such curing agents include polyvalent isocyanate compounds such as tolylene diisocyanate, triphenylmethane triisocyanate, hexamethylene diisocyanate, and the like; condensation products thereof with polyhydric alcohols; condensation products with isocyanate compounds; and the like. Specifically, Colonate L, Colonate LH, and Colonate-2030 (produced by Nippon Polyurethane Co., Ltd.), Takenate D-200 and Takenate D-202 (produced by Takeda Chemical Industries, Ltd.) can be used. These compounds can be used singly or in combination of at least two compounds.

In the present invention, a known ferromagnetic material powder can be used as the magnetic powder for the magnetic layer. For example, a powder of ferromagnetic iron oxide ($\gamma$—$Fe_2O_3$, $Fe_3O_4$, or the like), Co-containing iron oxide, ferromagnetic chromium dioxide, ferromagnetic metal, barium ferrite, iron carbide or the like can be used.

As an abrasive, an inorganic filler such as a metal oxide, a metal sulfide, a metal sulfate, a metal carbonate, a metal nitride, a metal carbide, or the like can further be added to the magnetic layer according to demand.

Also known additives such as a conductive fine powder, an antistatic agent such as a surfactant or the like, a dispersant, a silane or titanium coupling agent, and the like can be added to the magnetic layer according to demand.

As the nonmagnetic support of the coating type magnetic recording medium of the present invention, a known nonmagnetic support can be used, and for example, a polyethylene terephthalate film or the like can preferably be used.

The coating type magnetic recording medium of the present invention can be produced by uniformly mixing the magnetic powder and the binder, and if required, other additives by using a solvent such as toluene to prepare a magnetic coating composition, coating the magnetic coating composition on the nonmagnetic support by a normal method, performing orientation, and then drying the coating to form the magnetic layer.

EXAMPLES

The present invention will be described in detail below with reference to examples. First, experimental examples (Comparative Examples A1 to A6 and Examples A1 to A4) of the composition of the binder are described, and next, experimental examples (Comparative Examples B1 to B9 and Examples B1 and B2) of the composition of the lubricant are described. Then an experimental example (Example C) of the extraction and ratio of the lubricant is described.

Comparative Example A1

The components (a polyester polyurethane resin was used as the binder) shown in Table 1 were uniformly mixed (premixed) by agitation, and further dispersed with a sand mill for about 1 hour to prepare a magnetic coating. At this time, the amount of the lubricant added was set so that the surface extraction of the lubricant from the magnetic recording medium formed was $1.0 \times 10^{-2}$ g/m².

The thus-obtained magnetic coating was coated on a polyester film so that the dry thickness was 5 μm, subjected to magnetic orientation and then dried to form a magnetic recording medium.

TABLE 1

| (Magnetic coating composition) | Parts by weight |
|---|---|
| Ferromagnetic iron oxide powder ($\gamma$-Fe$_2$O$_3$ (specific surface area 25 m$^2$/g)) | 100 |
| Binder (polyester polyurethane resin*1) | 20 |
| Carbon black | 1 |
| Alumina | 2 |
| Dispersant ($\gamma$-aminopropoyltriethoxysilane) | 2 |
| Methyl ethyl ketone | 100 |
| Toluene | 100 |
| Cyclohexanone | 100 |
| Lubricant (polyhydric alcohol ester *2/silicone oil*3 = (2/1)) | any amount |

Note of Table 1
*1Having a number average molecular weight of 25000, a glass transition point of 45° C., and a —SO$_3$Na group content of 0.40 mmol/g.
*2Having a melting point of 0° C.
*3Containing fluorine, and having a molecular weight of about 7000.

Comparative Example A2

A magnetic coating was prepared by the same method as Comparative Example A1 except that 20 parts by weight of phenoxy resin *4 having a number average molecular weight of 24000 and a glass transition point of 95° C. was used as the binder in place of the polyester polyurethane resin *1, and a magnetic recording medium was formed by the same method.

Comparative Example A3

A magnetic coating was prepared by the same method as Comparative Example A1 except that 20 parts by weight of vinyl chloride-vinyl acetate copolymer *5 having a number average molecular weight of 22000 and a glass transition point of 70° C. was used as the binder in place of the polyester polyurethane resin *1, and a magnetic recording medium was formed by the same method.

Comparative Example A4

A magnetic coating was prepared by the same method as Comparative Example A1 except that 16 parts by weight of polyester polyurethane resin *1 and 4 parts by weight of vinyl chloride-vinyl acetate copolymer *5 were used for the binder, and a magnetic recording medium was formed by the same method.

Comparative Example A5

A magnetic coating was prepared by the same method as Comparative Example A1 except that 16 parts by weight of vinyl chloride-vinyl acetate copolymer *5 and 4 parts by weight of phenoxy resin *4 were used for the binder, and a magnetic recording medium was formed by the same method.

Comparative Example A6

A magnetic coating was prepared by the same method as Comparative Example A1 except that 4 parts by weight of vinyl chloride-vinyl acetate copolymer *5 and 16 parts by weight of phenoxy resin *4 were used for the binder, and a magnetic recording medium was formed by the same method.

Example A1

A magnetic coating was prepared by the same method as Comparative Example A1 except that 18 parts by weight of polyester polyurethane resin *1 and 2 parts by weight of phenoxy resin *4 were used for the binder, and a magnetic recording medium was formed by the same method.

Example A2

A magnetic coating was prepared by the same method as Comparative Example A1 except that 16 parts by weight of polyester polyurethane resin *1 and 4 parts by weight of phenoxy resin *4 were used for the binder, and a magnetic recording medium was formed by the same method.

Example A3

A magnetic coating was prepared by the same method as Comparative Example A1 except that 14 parts by weight of polyester polyurethane resin *1 and 6 parts by weight of phenoxy resin *4 were used for the binder, and a magnetic recording medium was formed by the same method.

Example A4

A magnetic coating was prepared by the same method as Comparative Example A1 except that 16 parts by weight of polyester polyurethane resin *6 (a number average molecular weight of 25000, a glass transition point of 40° C., a —SO$_3$Na group content of 0.040 mmol/g, and a —OH group content of 0.060 mmol/g), and 4 parts by weight of phenoxy resin *4 were used for the binder, and a magnetic recording medium was the formed by the same method as Comparative Example A-1 except that 2 parts by weight of curing agent (Colonate L produced by Nippon Polyurethane Co., Ltd.) was added to the obtained magnetic coating.

(Evaluation)

The magnetic recording media of Comparative Examples A1 to A6 and Examples A1 to A4 were evaluated with respect to magnetic properties, durability and reliable running performance. The results obtained are shown in Table 2.

The magnetic properties were measured by using a magnetic property measuring apparatus (VSM).

For the durability, the amount of the powder falling after 100 times of running on an opposite fixed head was shown by a numeral value, and relatively evaluated on the basis of the magnetic recording medium of Comparative Example A1 having properties at the lower limit level without practical problems. A case where the amount of powder falling was 50% or less of Comparative Example A1 was ranked as "○", a case where the amount of the powder falling was 50 to 80% of Comparative Example A1 was ranked as "Δ", a case where the amount of the powder falling was 80 to 120% of Comparative Example A1 was ranked as "x", and a case where the amount of the powder falling was 120% or more of Comparative Example A1 was ranked as "xx".

In regard to running reliability, wow flutter in running was measured, and relatively evaluated on the basis of the magnetic recording medium of Comparative Example A1. A case where wow flutter in running was 50% or less of Comparative Example A1 was ranked as "○", a case where wow flutter was 50 to 80% of Comparative Example A1 was ranked as "Δ", a case where wow flutter was 80 to 120% of Comparative Example A1 was ranked as "x", and a case where wow flutter was 120% or more of Comparative Example A1 was ranked as "xx".

TABLE 2

|  | Magnetic properties (Br[mT]) | Running stability | Durability |
| --- | --- | --- | --- |
| Comparative Example A1 | 160 | x | x |
| Comparative Example A2 | 135 | xx | xx |
| Comparative Example A3 | 145 | x | x |
| Comparative Example A4 | 160 | Δ | x |
| Comparative Example A5 | 150 | Δ | x |
| Comparative Example A6 | 140 | Δ | x |
| Example A1 | 160 | Δ | Δ |
| Example A2 | 160 | ○ | ○ |
| Example A3 | 150 | Δ | ○ |
| Example A4 | 160 | ○ | ○ |

The results shown in Table 2 indicate that the magnetic recording media of Examples A1 to A4 each using a combination of a polyester polyurethane resin and a phenox resin as the binder for the magnetic coating exhibit excellent results in the terms of magnetic properties, durability and running stability. It was also found that at a mixing ratio of polyester polyurethane resin to phenox resin ranging from 9:1 to 7:3, particularly 8:2, preferable results are obtained. It was further found that by mixing the hardener, preferable results are obtained.

On the other hand, it is found that in the use of one of a polyester urethane resin, a vinyl chloride-vinyl acetate copolymer, and a phenox resin, unsatisfactory results are obtained.

In order to examine a suitable mixing ratio of polyester polyurethane resin to phenox resin, a magnetic coating was prepared by the same method as Comparative Example A1 except that a binder (12 parts by weight of polyester polyurethane resin*1, and 8 parts by weight of phenox resin*4) containing the phenox resin at a relatively high ratio, and a magnetic recording medium was formed by the same method. As a result, it was found that the running stability and durability tend to deteriorate as compared with Examples 1 to 4.

In order to study influences of the glass transition temperature of the binder, a magnetic coating was prepared by the same method as Comparative Example A1 except that a binder (16 parts by weight of polyester polyurethane resin *7 (a number average molecular weight of 27000, a glass transition point of 0° C., and a —COOH group content of 0.100 mmol/g) and 4 parts by weight of phenox resin *4) having a glass transition temperature lower than the general operation temperature (room temperature) of a magnetic recording medium was used, and a magnetic recording medium was formed by the same method. As a result, it was found that since the binder is much softer than the binders used in Examples 1 to 4, the friction coefficient tends to increase, and the durability tends to deteriorate. Similarly, a magnetic coating was prepared by the same method as Comparative Example A1 except that a binder (16 parts by weight of polyester polyurethane resin *8 (a number average molecular weight of 20000, a glass transition point of 70° C., and a —COOH group content of 0.080 mmol/g) and 4 parts by weight of phenox resin *4) having a glass transition temperature higher than room temperature was used, and a magnetic recording medium was formed by the same method. As a result, it was found that since the binder is much harder than the binders used in Examples 1 to 4, the running stability and durability tend to deteriorate. Therefore, it was found that with a binder having a glass transition temperature of 30 to 70° C., the stability of a magnetic recording medium in running at room temperature is improved, and the durability is also improved.

Comparative Example B1

The components (a fatty acid (myristic acid) was used as the lubricant) shown in Table 3 were uniformly mixed (premixed) by agitation, and further dispersed with a sand mill for about 1 hour to prepare a magnetic coating. At this time, the amount of the lubricant added was set so that the surface extraction of the lubricant from the magnetic recording medium formed was $1.0 \times 10^{-2}$ g/m$^2$.

The thus-obtained magnetic coating was coated on a polyester film so that the dry thickness was 5 μm, subjected to magnetic orientation and then dried to form a magnetic recording medium.

TABLE 3

| (Magnetic coating composition) | Parts by weight |
| --- | --- |
| Ferromagnetic iron oxide powder ($\gamma$-Fe$_2$O$_3$ (specific surface area 25 m$^2$/g)) | 100 |
| Binder (polyester polyurethane resin*1) | 16 |
| phenox resin*4 | 4 |
| Carbon black | 1 |
| Alumina | 2 |
| Dispersant ($\gamma$-aminopropoyltriethoxysilane) | 2 |
| Methyl ethyl ketone | 100 |
| Toluene | 100 |
| Cyclohexanone | 100 |
| Lubricant | any amount |

Comparative Example B2

A magnetic coating was prepared by the same method as Comparative Example B1 except that a fatty acid ester (heptyl stearate) was used as the lubricant, and a magnetic recording medium was formed by the same method.

Comparative Example B3

A magnetic coating was prepared by the same method as Comparative Example B1 except that a polyhydric alcohol ester*9 (an ester of a quadrivalent alcohol and a fatty acid having a carbon number of about 15) was used as the lubricant, and a magnetic recording medium was formed by the same method.

Comparative Example B4

A magnetic coating was prepared by the same method as Comparative Example B1 except that silicone oil*3 was used as the lubricant, and a magnetic recording medium was formed by the same method.

Comparative Example B5

A magnetic coating was prepared by the same method as Comparative Example B1 except that myristic acid and heptyl stearate were used for the lubricant at a ratio by weight of 1:1, and a magnetic recording medium was formed by the same method.

Comparative Example B6

A magnetic coating was prepared by the same method as Comparative Example B1 except that myristic acid and the polyhydric alcohol ester*9 were used for the lubricant at a ratio by weight of 1:1, and a magnetic recording medium was formed by the same method.

Comparative Example B7

A magnetic coating was prepared by the same method as Comparative Example B1 except that myristic acid and the silicone oil*3 were used for the lubricant at a ratio by weight of 1:1, and a magnetic recording medium was formed by the same method.

Comparative Example B8

A magnetic coating was prepared by the same method as Comparative Example B1 except that heptyl stearate and the polyhydric alcohol ester*9 were used for the lubricant at a ratio by weight of 1:1, and a magnetic recording medium was formed by the same method.

Comparative Example B9

A magnetic coating was prepared by the same method as Comparative Example B1 except that heptyl stearate and silicone oil*3 were used for the lubricant at a ratio by weight of 1:1, and a magnetic recording medium was formed by the same method.

Example B1

A magnetic coating was prepared by the same method as Comparative Example B1 except that the polyhydric alcohol ester*9 and silicone oil*3 were used for the lubricant at a ratio by weight of 1:1, and a magnetic recording medium was formed by the same method.

Example B2

A magnetic coating was prepared by the same method as Comparative Example B1 except that a polyhydric alcohol ester*10 (an ester of glycerin and a fatty acid having a carbon number of about 15) and silicone oil*3 were used for the lubricant at a ratio by weight of 1:1, and a magnetic recording medium was formed by the same method.

(Evaluation)

Table 4 shows a list of combinations of lubricants in magnetic recording media of Comparative Examples B1 to B9 and Examples B1 and B2. These magnetic recording media were evaluated with respect to friction coefficient and durability in running. The results obtained are shown in Table 5.

For the friction coefficient, the maximum static coefficient of friction with an opposite fixed head was measured at each of temperatures. A case where the friction coefficient was decreased by 20% or more as compared with the magnetic recording medium of Comparative Example B1 which showed a value at the substantially lowest level of practical magnetic recording media, was ranked as "○", a case where the friction coefficient was equivalent to Comparative Example B1 was ranked as "Δ", and a case where the friction coefficient was increased by 20% or more as compared with Comparative Example B1 was ranked as "x".

In regard to the durability, a case where the amount of the powder falling after running was decreased by 30% or more as compared with Comparative Example B1 was ranked as "○", a case where the amount of the powder falling was equivalent to Comparative Example B1 was ranked as "Δ", and a case where the amount of the powder falling was increased by 30% or more as compared with Comparative Example B1 was ranked as "x".

TABLE 4

| | Fatty acid | Fatty acid ester | Polyhydric alcohol ester | Silicone oil |
|---|---|---|---|---|
| Fatty acid | Comparative Example B1 | | | |
| Fatty acid ester | Comparative Example B5 | Comparative Example B2 | | |
| Polyhydric alcohol ester | Comparative Example B6 | Comparative Example B8 | Comparative Example B3 | |
| Silicone oil | Comparative Example B7 | Comparative Example B9 | Comparative Examples B1, B2 | Comparative Example B4 |

TABLE 5

| | Friction coefficient | | Durability | |
|---|---|---|---|---|
| | 0° C. | 50° C. | 0° C. | 50° C. |
| Comparative Example B1 | Δ | Δ | Δ | Δ |
| Comparative Example B2 | x | Δ | x | Δ |
| Comparative Example B3 | Δ | Δ | Δ | Δ |
| Comparative Example B4 | Δ | x | Δ | x |
| Comparative Example B5 | x | Δ | Δ | Δ |
| Comparative Example B6 | Δ | Δ | Δ | Δ |
| Comparative Example B7 | Δ | x | Δ | Δ |
| Comparative Example B8 | x | Δ | x | Δ |
| Comparative Example B9 | Δ | Δ | Δ | Δ |
| Example B1 | Δ | ○ | Δ | ○ |
| Example B2 | ○ | ○ | ○ | ○ |

Table 5 reveals that by using a combination of a polyhydric alcohol ester and silicone oil as the lubricant, stable running performance and durability can be obtained at each of the temperatures. Particularly, a glycerin ester is preferably used as a polyhydric alcohol ester.

It is also found that in the use of one of a fatty acid, a fatty acid ester, a polyhydric alcohol ester and silicone oil, or the use of a combination other than a combination of a polyhydric alcohol ester and silicone oil, preferable results cannot be obtained.

Example C

The relation between the feed (mixing) ratio of the lubricant (a polyhydric alcohol ester to silicone oil) and the surface extraction was examined as follows.

The components shown in Table 6 including a lubricant comprising a polyhydric alcohol ester and silicone oil at each of the adding (mixing) ratios shown in Table 7 were uniformly mixed (premixed) by agitation, and further dispersed by using a sand mill for about 1 hour to prepare a magnetic coating. The amount of the lubricant added was set so that the surface extraction of the lubricant from a magnetic recording medium is each of the values shown in Table 7.

The thus-obtained magnetic coating was coated on a polyester film so that the dry thickness was 5 μm, subjected to magnetic orientation and then dried to form a magnetic recording medium.

TABLE 6

| (Magnetic coating composition) | Parts by weight |
|---|---|
| Ferromagnetic iron oxide powder ($\gamma$-Fe$_2$O$_3$ (specific surface area 25 m$^2$/g)) | 100 |
| Binder (polyester polyurethane resin*1) | 16 |
| phenox resin*4 | 4 |
| Carbon black | 1 |
| Alumina | 2 |
| Dispersant ($\gamma$-aminopropoyltriethoxysilane) | 2 |
| Methyl ethyl ketone | 100 |
| Toluene | 100 |
| Cyclohexanone | 100 |
| Lubricant | any amount |

For the thus-obtained magnetic recording media, the friction coefficient and running durability were measured and evaluated. The results obtained are shown in Table 7.

For the friction coefficient, the maximum static coefficient of friction with an opposite fixed head was measured at room temperature. A case of where the friction coefficient was better than the magnetic recording medium of Comparative Example B1, which showed a value at the substantially lowest level of practical magnetic recording media, was ranked as "o", and a case where the friction coefficient was equivalent to or poorer than Comparative Example B1 was ranked as "x".

In regard to the durability, a case where the amount of the powder falling after running on the opposite fixed head was decreased by 30% or more a compared with Comparative Example B1 was ranked as "o", and a case where a decrease in the amount of the powder falling was less than 30% was ranked as "x".

TABLE 7

(adding ratio (polyhydric alcohol:silicone oil))

| Surface extension (g/m$^2$) | 1:2 | 1:1 | 2:1 | 5:1 | 8:1 |
|---|---|---|---|---|---|
| | | friction coefficient/durability | | | |
| (1.0 × 10$^{-1}$) | — | — | — | — | — |
| 5.0 × 10$^{-2}$ | o/o | o/o | — | x/x | — |
| 3.0 × 10$^{-2}$ | o/x | o/o | o/o | o/o | x/o |
| 1.0 × 10$^{-2}$ | o/x | o/o | o/o | o/o | — |
| 3.0 × 10$^{-3}$ | x/x | o/o | o/o | o/o | x/x |
| 1.0 × 10$^{-3}$ | — | x/o | — | o/x | — |

Table 7 reveals that when the surface extraction of a lubricant comprising a polyhydric alcohol ester and silicone oil is at least 3.0×10$^{-3}$ to 3.0×10$^{-2}$ g/m$^2$, preferable results are obtained. In this case, the feed ratio of polyhydric alcohol ester to silicone oil is found to be preferably 1:1 to 5:1.

The present invention can impart good running stability and durability to a magnetic recording medium comprising a combination of a polyester polyurethane resin and a phenox resin as a binder for a magnetic layer of a coating type magnetic recording medium while ensuring excellent magnetostatic properties

What is claimed is:

1. A magnetic recording medium comprising:

a nonmagnetic support; and a magnetic layer formed on said nonmagnetic support, said magnetic layer comprising a magnetic powder, a binder and a lubricant, said binder comprising a polyester polyurethane resin and a phenoxy resin, said lubricant comprising a polyhydric alcohol ester and silicone oil, the surface extraction from said coating type magnetic recording medium being 3.0×10$^{-3}$ to 3.0×10$^{-2}$ g/m$^2$, one of said polyester polyurethane resin and said phenoxy resin having a functional group which improves dispersability of the magnetic powder, a ratio by weight of said polyester polyurethane resin to said phenoxy resin is from 9:1 to 7:3, a ratio by weight of polyhydric ester to silicone oil is from 1:1 to 5:1, and said binder does not have a glass transition outside of the range from 30° C. to 70° C.

2. The magnetic recording medium of claim 1, wherein said functional group is a hydroxyl group.

3. The magnetic recording medium of claim 1, wherein said magnetic layer also comprises a hardener.

4. The magnetic recording medium of claim 3, wherein said functional group is a hydroxyl group.

* * * * *